United States Patent
Bohorquez et al.

[15] 3,679,320
[45] July 25, 1972

[54] PORTABLE RIGHT ANGLE DRILL

[72] Inventors: Luis Bohorquez, Inglewood; Pierre G. Vindez, Redondo Beach, both of Calif.

[73] Assignee: Zephyr Manufacturing Co., Inc. - Manufacturing Division, Los Angeles, Calif.

[22] Filed: Oct. 28, 1970

[21] Appl. No.: 84,731

[52] U.S. Cl..............................408/99, 408/14, 408/111, 408/133
[51] Int. Cl..........................................B23b 47/18
[58] Field of Search....................408/14, 99, 111, 110, 113, 408/101, 137, 138, 133, 100, 102, 132

[56] References Cited

UNITED STATES PATENTS 3,538,794  11/1970  Grundmeyer..........................408/99
3,487,729  1/1970  Juhasz et al..............................408/14
3,512,434  5/1970  Juhasz et al..........................408/137 X Primary Examiner—Gil Weidenfeld
Attorney—Whann & McManigal

[57] ABSTRACT

A portable drill with two gear trains driven by a single motor wherein one gear train rotatably drives a drill spindle and a pair of feed spindles through a connection that permits axial movement of the spindles, and the other gear train drives the pair of feed spindles through threaded connections therewith. The feed spindles carry a footplate adapted to be clamped to the work. Means is provided for changing the gear ratios of one gear train and other means provided for selectively stopping either gear train in order to advance and retract the feed spindles at different speeds.

14 Claims, 7 Drawing Figures

INVENTORS
LUIS BOHORQUEZ
PIERRE G. VINDEZ
BY
WHANN & MCMANIGAL
ATTORNEYS FOR APPLICANTS

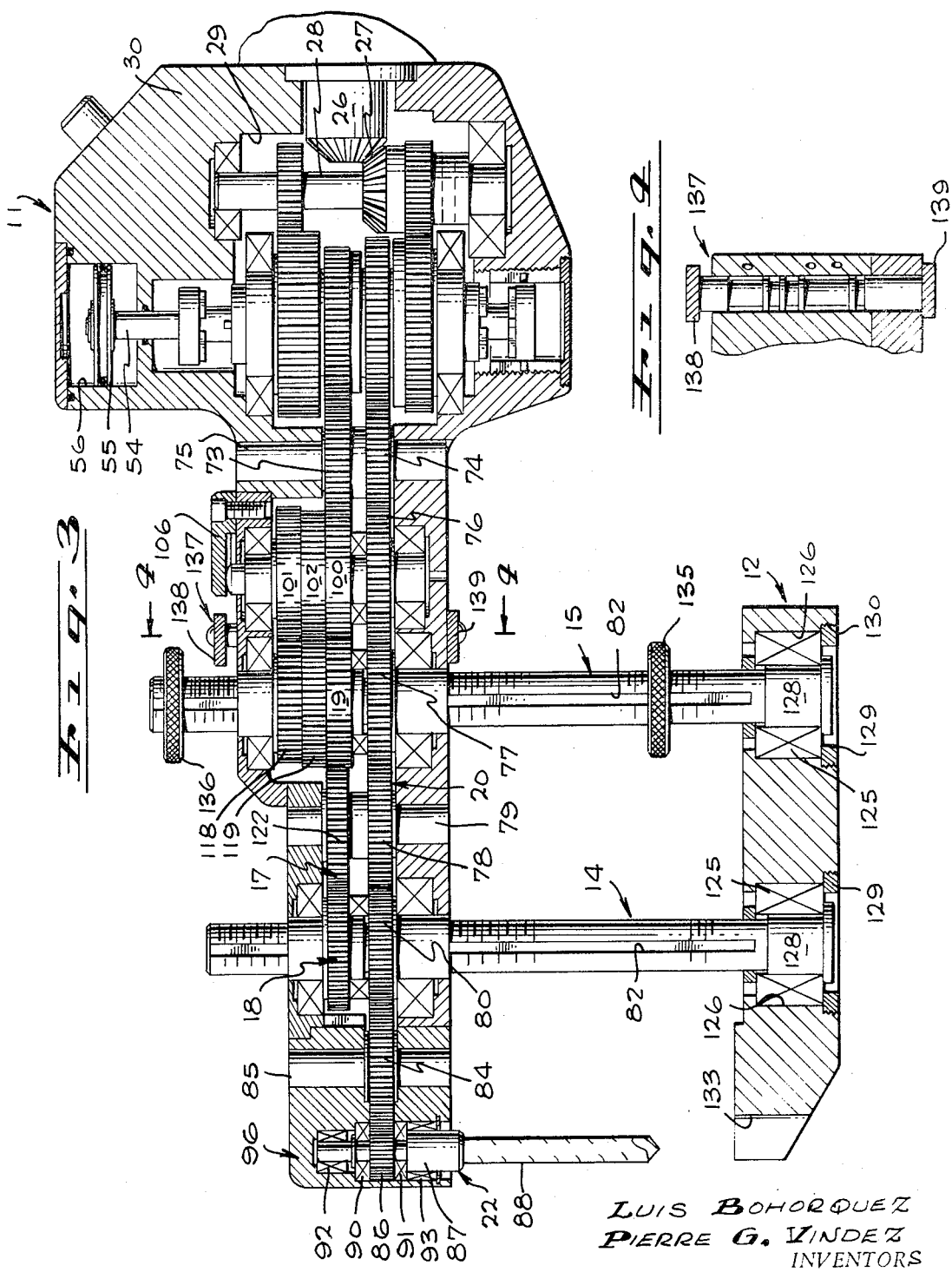

LUIS BOHORQUEZ
PIERRE G. VINDEZ
INVENTORS

WHANN & McMANIGAL
BY ATTORNEY FOR
APPLICANTS

PORTABLE RIGHT ANGLE DRILL

The invention relates generally to portable motorized drills embodying feed means and particularly to those embodying means for advancing and retracting drill feed mechanism at various speeds.

An object of the invention is to provide a novel, motor-driven drill designed for drilling at right angles to the general longitudinal axis of the device and particularly designed for drilling holes in recessed areas of the work where access is so difficult that standard drills cannot reach the area.

In general it is an object of the invention to provide a drill of the type indicated embodying a footplate adapted to be clamped to the work and novel means connecting the body of the drill with the footplate so that with the footplate clamped to the work the drill as a whole can be fed toward the work or moved away from it. In this connection it is an object to provide a novel dual spindle arrangement on which the footplate is mounted.

A further object is to provide in connection with a dual gear train feed system, novel means for enabling the quick changing of the gear ratio of at least one of the gear trains in order to change the rate of feed.

A further object is to provide a new and improved feed system utilizing dual gear trains driving one or more feed spindles in which the gear trains are driven by a single drive gear and embody novel means for selectively disconnecting either one of the gear trains and holding it against rotation whereby to enable the operator to vary the direction and speed of feed of the spindles.

Still another object is to provide a tool of the type indicated in which the drill body is provided with a replaceable head which contains the drill stem thereby making it possible to utilize different sizes and types of drill stems.

These and other objects will be apparent from the drawings and the following description. Referring to the drawings:

FIG. 3 is a fragmentary longitudinal sectional view of the tool, but on a larger scale;

FIG. 4 is a fragmentary sectional view in the same plane as FIG. 3, but on a larger scale;

Figure 1:
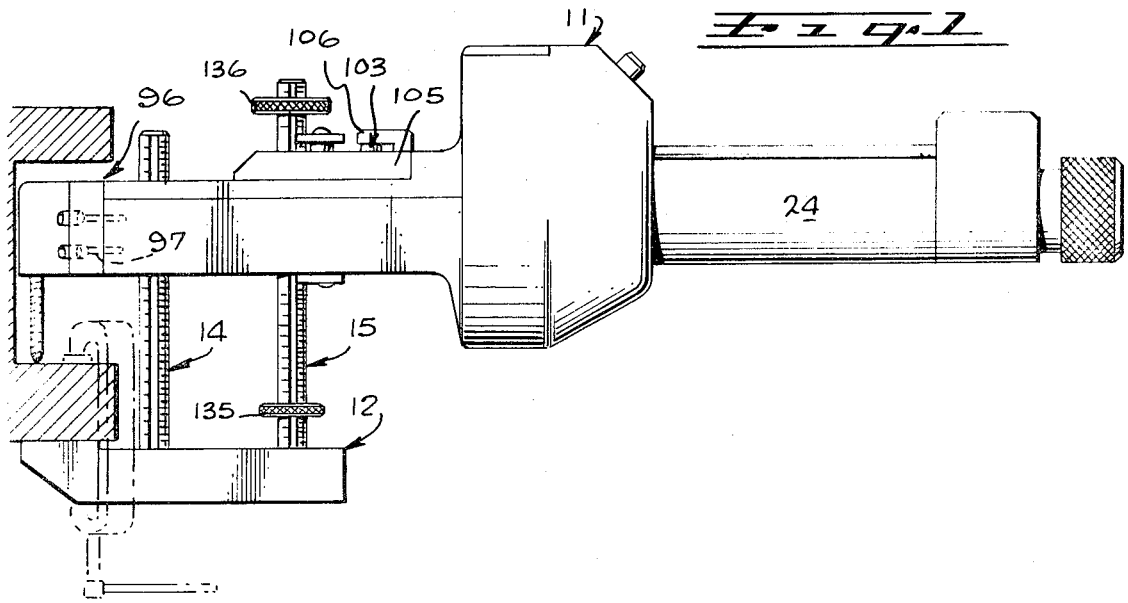
FIG. 1 is a side elevational view of a tool embodying the invention shown in conjunction with a workpiece, fragmentarily shown in section.
Figure 2:
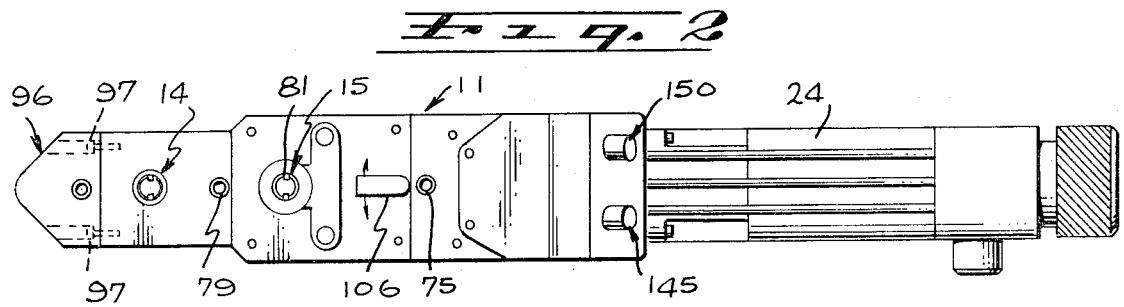
FIG. 2 is a plan view of the tool.

More particularly describing the invention, the tool as a whole comprises a housing body 11 and, generally parallel to this, a footplate 12 carried upon a pair of feed spindles, designed 14 and 15, respectively. The body houses two gear trains, namely, a feed gear train 17 that has internally threaded gears 18 and 19 that receive the respective spindles 14 and 15 which are externally threaded, and a drive gear train 20 that rotates the feed spindles 14 and 15 and also a drill spindle 22. The gear trains are driven by a motor 24 which is mounted at the back end of the body 11 and extends generally in alignment with the longitudinal axis thereof. Preferably a variable speed, governor-controlled air motor is used, however, other type motors may be employed. Also, by the use of a suitable adapter and necessary gearing the motor may be mounted to extend at a right angle, or at some other angle, to the longitudinal axis of the body, or made to extend parallel thereto but at one side or the other.

The motor shaft 25 has a bevel gear 26 fixed to the end thereof which meshes with a bevel gear 27 on a shaft 28 within a cavity 29 of the enlarged rear section 30 of the body. The shaft has pinions 31 and 32 fixedly mounted on it, pinion 32 having a hub 32' journaled in a bearing 34 thereby supporting one end of the shaft. A bearing 35 gives radial support to the other end. Gear 32 has end splines 36 received in radial grooves 37 so that the two gears act as a unit.

The feed gear train 17 is driven by pinion 31 while the drive gear train 20, which rotates all three spindles, is driven by pinion 32. Pinion 31 engages a clutch drive gear 41 while pinion 32 engages a similar clutch drive gear 42. The gears 41 and 42 are journaled in bearings 43 and 44, respectively, and support inner bearings 45 and 46, respectively, which are interposed between them and clutch-driven gears, designed 47 and 48, respectively. The clutch drive gears are normally in engagement with the clutch-driven gears through a clutching mechanism which includes clutch balls 50 in apertures 51 in cylindrical extensions 47' and 48' of gears 47 and 48, respectively, and internal grooves 41' and 42' in the gears 41 and 42, respectively.

The clutch mechanism which can be operated selectively to disengage either the drive gear train or feed gear train from the power-driven gears also serves as a means of stopping and holding the disengaged gear train against rotation. The clutch mechanism comprises a shaft 54, mounted for limited axial movement in the body, which carries a piston at 55 at its upper end within a cylinder 56 formed in the body. The other end of the shaft carries a brake disk 58 held in place by a pin 59 through the shaft, the ends of which are received in slots 60 of a cap 61 which threads into bore 29'. Spaced inwardly from its upper end the shaft carries another brake disk, designated 63, anchored by a pin 64 through the shaft. Disks 58 and 63 have serrated or toothed inner end faces, designated 58' and 63', respectively, adapted to engage similar faces 48A and 47A, respectively on the ends of gears 48 and 47.

Inwardly of each of the brake disks is a sleeve 66 and a cam element 67 with a thrust bearing 68 therebetween and a thrust bearing 69 beyond each cam element. A compression coil spring 71 is positioned between the bearings 69, serving to yieldably maintain the two cam elements in the position in which they are shown in FIG. 4 where they hold the clutch balls 50 in engagement with the clutch drive gears. By moving the shaft 54 in one direction or the other either one or the other of the clutch elements will be moved inwardly and permit disengagement of the associated balls 50. For example, if fluid under pressure is admitted to cylinder 56 above the piston 55 the shaft 54 will move down thereby carrying the upper cam element 67 down with it to permit the balls 50 to disengage from gear 41. At the end of the shaft 54 gear 47 is engaged by the brake disk 63 to lock it against rotation. Thus with this arrangement either one of the gear trains can be stopped while the other continues to be driven.

Gears 47 and 48 mesh with idler gears 73 and 74, respectively, on a tubular shaft 75 in the body. Gear 74 meshes with a gear 76 that in turn drives the gear 77 on spindle 15. Gear 77 drives the spindle 14 through the medium of an idler gear 78 on shaft 79 which meshes with a drive gear 80 on spindle 14. Gears 77 and 80 are similarly constructed, each being provided with internal splines 81 which are slidably received in longitudinal grooves 82 in the respective spindles thereby permitting axial movement of the spindles through the drive gears. Drive gear 80 in turn rotates the drill spindle 22 through the medium of an idler gear 84 on a shaft 85, the gear meshing with a pinion 86 splined to the spindle. The latter has an enlarged portion 87 that is internally threaded at its exposed lower end to mount a drill bit 88 or other tool. Bearings 90 and 91 are provided above and below the pinion, respectively, while bearings 92 and 93 further support the spindle.

It is a feature of the invention that the nose or drilling head 96 of the body is detachably secured in place so that it can be readily removed in order to fit another head having a different size or type of spindle 22. Four screws 97 serve to hold the head in place.

It will be understood from the description thus far that with both the feed gear train 17 and the drive gear train 20 operating and with the parts in the position shown in FIGS. 3 and 4, that the device will feed or advance at the appropriate speed for drilling the material of the particular workpiece, that is, the distance between the footplate and the body gradually decreases. This is accomplished by the fact that the two gears 77 and 80 rotate spindles 15 and 14, respectively, in a direction such that they thread themselves through the internally threaded gears 19 and 18 of the feed gear train, the pitch of the threads being such with relation to the speed of rotation of the spindles and the speed of rotation of gears 18 and 19 that the spindles move axially as described.

If the feed gear train is stopped, the tool will rapidly retract, that is, the distance between the footplate and the body will increase. As hereinbefore described, the feed gear train is stopped by admitting fluid pressure through suitable controls to the outer end of cylinder 56 in order to move the piston 55 and shaft 54 downwardly and thereby disengage the gear 47 and hold it against rotation.

On the other hand, if the drive gear train is stopped, the tool will be fed forward rapidly, that is, the distance between the footplate and the housing will rapidly decrease, but none of the spindles will be rotated. This is brought about by the admittance of fluid pressure into cylinder 56 beneath piston 55 in order to raise the shaft 54 and thereby disengage gear 48 and hold it against rotation.

One of the features of the construction is the provision of means apart from that previously described which enables the operator to change the normal rate of advance or feed during drilling, such as might be desired for drilling through sandwich material made up of two metals of different hardness. Turning to a description of this feature, the feed idler gear 73 drives a clutch drive gear designated 100 which is engageable to drive selectively either of two clutch-driven gears designated 101 and 102, respectively. The clutching mechanism includes a control pin 103 which has an enlarged head or button 104 that projects through a cover plate 105 of the body. The pin is axially movable for a limited distance when not restrained as shown by a lock lever 106 pivotally mounted on a screw 107. A cam clutch element 108 is mounted on the pin between bearings 109 and 110 that are held by the head 104 and a retainer ring 111. When the pin is in the position shown it serves to hold clutch balls 112 in position in grooves 101' on the inner surface of gear 101, the balls being received in apertures 114 in gear 100, thereby locking gears 100 and 101 together as a unit. A spring 115 is positioned beneath the pin and serves to raise it a limited distance when the lever 106 is turned aside, allowing clutch element 108 to move upwardly and release the upper gear 101 from driven engagement with gear 100 and cause the lower set of clutch balls to enter the grooves 102' in the inner wall of gear 102 thereby locking gears 100 and 102 together.

Thus either one or the other of gears 101, 102 is engaged and these gears in turn mesh with gears 118 and 119, respectively, that are keyed to feed gear 19 which threadedly receives spindle 15. Gear 19 meshes with an idler gear 122 on shaft 79 and this in turn meshes with feed gear 18 on shaft 14.

The footplate 12 is mounted at the outer ends of the two feed spindles by means of suitable bearings 125 in bores 126 in the plate and end caps 128 on the spindles. A retainer ring 129 threads into a counterbore 130. With this arrangement the spindles may rotate within the plate but are mounted against axial movement relative thereto. The plate may be shaped according to the work requirements, it being shown with a tapered nose and a slot 133 positioned to pass a drill mounted in the drilling spindle should the drill penetrate the work.

It will be apparent that if the support plate is clamped to the work, as shown in FIG. 1, and the drill operated, the body of the drill will be moved or fed toward the work. In this connection spindle 15 is provided with adjustable stops 135 and 136 which can be set at the desired points to limit relative travel between the body and the footplate, the stops being adapted to operate a limit valve 137 having an upper portion 138 and a lower portion 139. The valve may be of the type shown in FIG. 9 of U.S. Pat. No. 3,512,434 and described therein. As will later appear, when the valve is engaged by stop 135, it serves to set in motion the means for retracting the body of the drill from the footplate, and when engaged by stop 136, serves to stop the operation of the drill.

Figure 6:
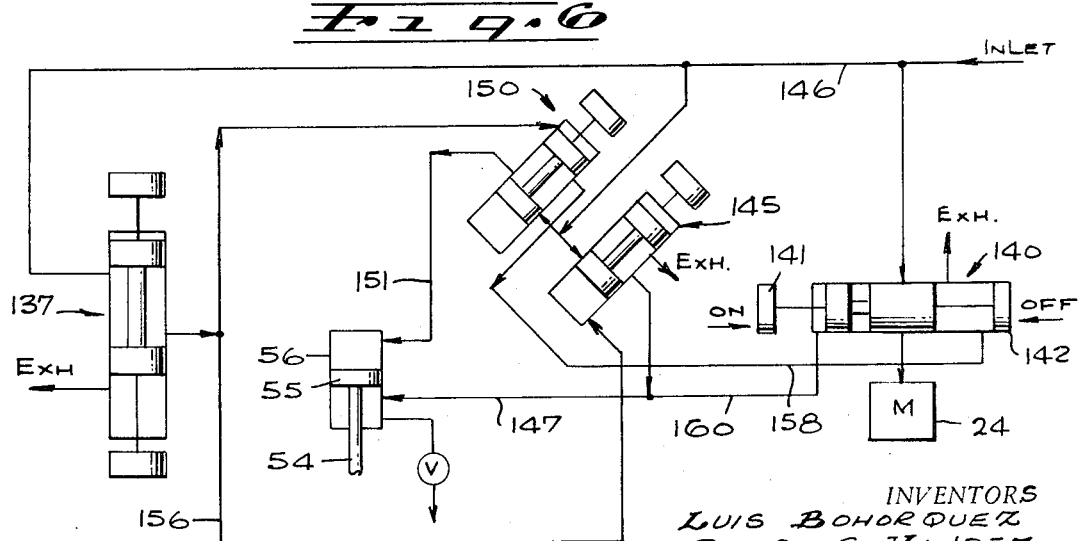
FIG. 6 is a diagrammatic view of the basic pneumatic system.
Figure 5:
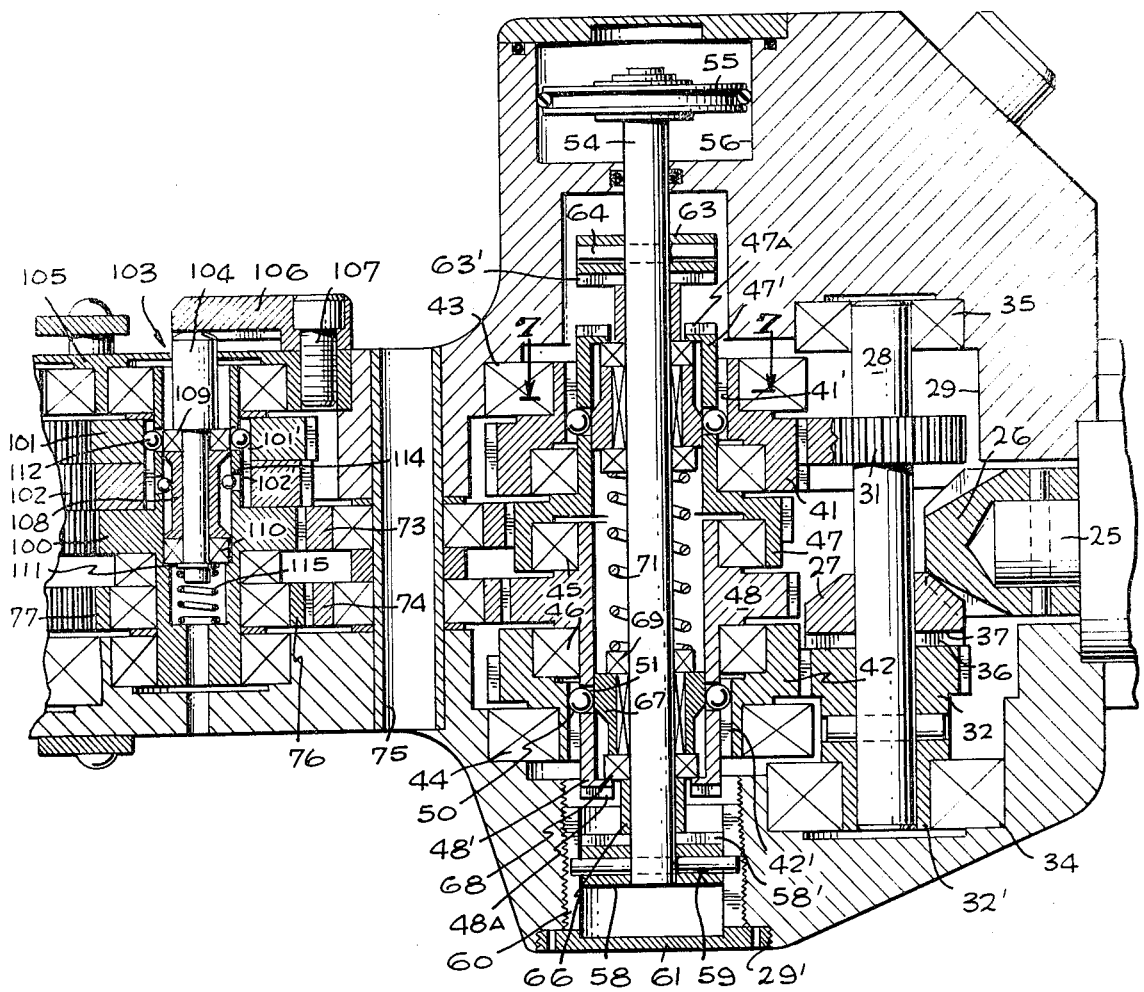
FIG. 5 is a fragmentary cross-sectional view of a portion of FIG. 1.
Figure 7:
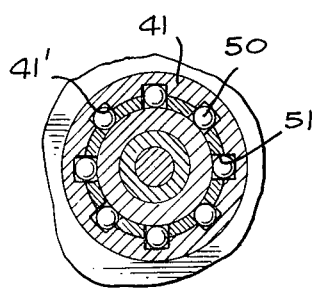
FIG. 7 is a fragmentary cross-sectional view taken along the line 7—7 of FIG. 5.

In FIG. 6 we show the basic controls of the pneumatic system. From these it will be seen that the tool is provided with a main valve 140 that controls the motor 24 and this has "on" and "off" buttons 141 and 142, respectively. When the "on" button is pushed, air is supplied to the motor and the tool operates at the normal feed rate with the parts as shown in the drawings so that the body of the tool gradually advances toward the footplate. To achieve a fast approach or advance, a fast-approach valve 145 is provided which, when actuated, is adapted to connect air inlet line 146 via passage 147 to the lower end of cylinder 56, thereby raising piston 55 and shaft 54 to disengage clutch-driven gear 48 from gear 42 and lock it against rotation. This stops the entire drive gear train and causes the tool body to advance rapidly toward the footplate.

A retraction valve 150 is provided for manually causing the body to retract or move away from the footplate. When this valve is operated, it serves to connect air inlet line 146 with the upper end of cylinder 56 through passage 151 thereby moving the piston 55 and shaft 54 down to disengage gear 47 and lock it and the feed gear train against rotation.

The tool also retracts automatically and shuts off if the manually operated valves 145 and 150 are not used. This is accomplished with the limit valve 137. When valve 137 is operated by stop 135 striking the end 139 thereof, air under pressure from the supply line 146 is directed to a closed conduit 156 which communicates with the outer end of the retraction valve 150 and with the inner end of the fast-approach valve 145, thereby serving to automatically operate valve 150 and insure that valve 145 is in normal position. The retraction cycle then begins and operates in the manner previously described for when the retraction valve 150 is manually operated. At the end of the retraction limit, determined by stop 136 which engages end 138 of the limit valve 137, the limit valve shifts to connect fluid line 156 to "exhaust" thereby permitting the retraction valve 150 to return to normal position under the influence of its own spring (not shown). In this position air under pressure escapes from above piston 55, through line 151 and valve 150 by way of a passage 158 to the main valve 140 which it operates to off position and then is exhausted. When the fast-approach valve 145 is operated, it also serves to supply pressure fluid through passage 160 to the main valve 140 serving to move it to "on" position, or merely hold it there.

We claim:

1. A right angle drill, comprising a body, a drill spindle extending transversely of the body adjacent an end thereof and adapted to hold a drill bit, at least one feed spindle extending through said body parallel to said drill spindle, a footplate carried on the outer end of said feed spindle and adapted to be detachably secured to the work, and gear train means in the body for rotating said drill spindle and for moving said feed spindle axially relative to the body, said gear train means being adapted to be power driven.

2. The drill set forth in claim 1 in which said gear train means includes a drive gear train for rotating said drill and feed spindles and a feed gear train including a threaded connection with said feed spindle.

3. The drill set forth in claim 2 in which means is provided for selectively disengaging either of said gear trains from the power drive.

4. The drill set forth in claim 2 in which means is provided for changing the gear ratio of one of said gear trains.

5. The drill set forth in claim 2 in which means is provided for changing the gear ratio of said feed gear train.

6. The drill set forth in claim 2 in which means is provided for selectively disengaging either of said gear trains from the power drive, and in which means is provided for changing the gear ratio of the feed gear train.

7. The drill set forth in claim 1 in which said drill spindle is mounted in a removable head detachably secured to the body.

8. The drill set forth in claim 1 in which there are a pair of laterally spaced feed spindles parallel to the drill spindle and in which the footplate is carried on said pair of feed spindles.

9. The drill set forth in claim 8 in which said gear train means includes a drive gear train for rotating all of said spindles and a feed gear train for axially moving said feed spindles relative to said body, and said feed gear train including a threaded connection with each feed spindle.

10. A right angle drill, comprising a body, a drill spindle extending transversely of the body adjacent an end thereof and adapted to hold a drill bit, a pair of feed spindles extending through said body parallel to said drill spindle, a footplate carried on the outer ends of said feed spindles and adapted to be detachably secured to the work, a motor mounted on the body, a drive gear train in the body constructed and arranged to rotate all of said spindles, a feed gear train including threaded connections with said feed spindles constructed and arranged to move said feed spindles axially of said body, and a drive connection between the motor and said gear trains.

11. The drill set forth in claim 10 in which means is provided for selectively disengaging either one of said gear trains from the motor.

12. The drill set forth in claim 11 in which means is provided for changing the gear ratio of one of said gear trains.

13. The drill set forth in claim 10 in which said motor is fluid operated and in which fluid-operated means is provided for disengaging either one of said gear trains from the motor including a fluid system adapted to be supplied with fluid under pressure, a manually operable valve means in said fluid system controlling flow of pressure fluid to said fluid-operated means, a main valve controlling flow of pressure fluid to said motor, and a limit valve operable in response to one of said feed spindles for controlling said manually operable valve means and said main valve means.

14. The drill set forth in claim 10 in which a clutch mechanism is provided for each gear train constructed and arranged to disengage the gear train from the motor, and in which a gear ratio changing means is included in said feed gear train constructed and arranged to enable selection of either one of at least two different gear ratios.

* * * * *